US008245060B2

(12) United States Patent
Worthington et al.

(10) Patent No.: US 8,245,060 B2
(45) Date of Patent: Aug. 14, 2012

(54) MEMORY OBJECT RELOCATION FOR POWER SAVINGS

(75) Inventors: Bruce L. Worthington, Redmond, WA (US); Stephen R. Berard, Seattle, WA (US); Sean N. McGrane, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 365 days.

(21) Appl. No.: 12/579,524

(22) Filed: Oct. 15, 2009

(65) Prior Publication Data

US 2011/0093726 A1    Apr. 21, 2011

(51) Int. Cl.
G06F 1/32    (2006.01)
(52) U.S. Cl. ........................... 713/320; 713/300
(58) Field of Classification Search .................. 713/300, 713/320
See application file for complete search history.

(56) References Cited

U.S. PATENT DOCUMENTS

| | | | | |
|---|---|---|---|---|
| 5,687,382 | A * | 11/1997 | Kojima et al. | 713/320 |
| 5,928,365 | A | 7/1999 | Yoshida | |
| 6,199,150 | B1 | 3/2001 | Yoshikawa | |
| 6,742,097 | B2 * | 5/2004 | Woo et al. | 711/170 |
| 6,954,837 | B2 | 10/2005 | Woo et al. | |
| 7,275,166 | B2 * | 9/2007 | Kaiju et al. | 713/320 |
| 7,428,622 | B2 * | 9/2008 | Tulyani | 711/161 |
| 7,454,573 | B2 | 11/2008 | Buyuktosunoglu et al. | |
| 7,539,841 | B2 | 5/2009 | Rawson, III | |
| 7,698,517 | B2 * | 4/2010 | Tulyani | 711/161 |
| 8,006,111 | B1 * | 8/2011 | Faibish et al. | 713/324 |
| 2005/0138284 | A1 * | 6/2005 | Cohn et al. | 711/114 |
| 2006/0248259 | A1 | 11/2006 | Ryu et al. | |
| 2007/0011421 | A1 * | 1/2007 | Keller et al. | 711/165 |
| 2007/0226409 | A1 | 9/2007 | Sutardja et al. | |
| 2008/0005516 | A1 | 1/2008 | Meinschein et al. | |
| 2008/0172539 | A1 | 7/2008 | Boss et al. | |
| 2008/0235477 | A1 | 9/2008 | Rawson | |
| 2009/0077307 | A1 | 3/2009 | Kaburlasos et al. | |

OTHER PUBLICATIONS

"International Search Report", Mailed Date: May 26, 2011, Application No. PCT/US2010/051702, Filed Date: Oct. 6, 2010, pp. 9.
Stoess, et al. "Transparent, Power-Aware Migration in Virtualized Systems—Published Date: 2007", Retrieved at<<http://i30www.ira.uka.de/research/documents/pm/2007/stoess07migration.pdf>>, pp. 6.
Delaluz, et al."Memory Energy Management Using Software and Hardware Directed Power Mode Control Published Date: 2001", Retrieved at<<http://citeseerx.ist.psu.edu/viewdoc/download-?doi=10.1.1.130.6798&rep=rep1&type=pdf>>, pp. 21.

* cited by examiner

*Primary Examiner* — Nitin Patel
(74) *Attorney, Agent, or Firm* — Russell S. Krajec; Krajec Patent Offices, LLC

(57) ABSTRACT

A computer system may manage objects in memory to consolidate less frequently accessed objects into memory regions that may be operated in a low power state where the access times may increase for the memory objects. By operating at least some of the memory regions in a low power state, significant power savings can be realized. The computer system may have several memory regions that may be independently controlled and may move memory objects to various memory regions in order to optimize power consumption. In some embodiments, an operation system level function may manage memory objects based on parameters gathered from usage history, memory topology and performance, and input from applications.

20 Claims, 3 Drawing Sheets

MEMORY OBJECT RELOCATION FOR POWER SAVINGS

BACKGROUND

Computer power consumption can be a large expense to datacenters and other operators of many computer systems. Power consumption is often coupled with cooling and other expenses within a datacenter, as computers that draw large amounts of power often have high cooling costs as well.

SUMMARY

A computer system may manage objects in memory to consolidate less frequently accessed objects into memory regions that may be operated in a low power state where the access times may increase for the memory objects. By operating at least some of the memory regions in a low power state, significant power savings can be realized. The computer system may have several memory regions that may be independently power-controlled and may move memory objects to various memory regions in order to optimize power consumption. In some embodiments, an operation system level function may manage memory objects based on parameters gathered from usage history, memory topology and performance, and input from applications.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
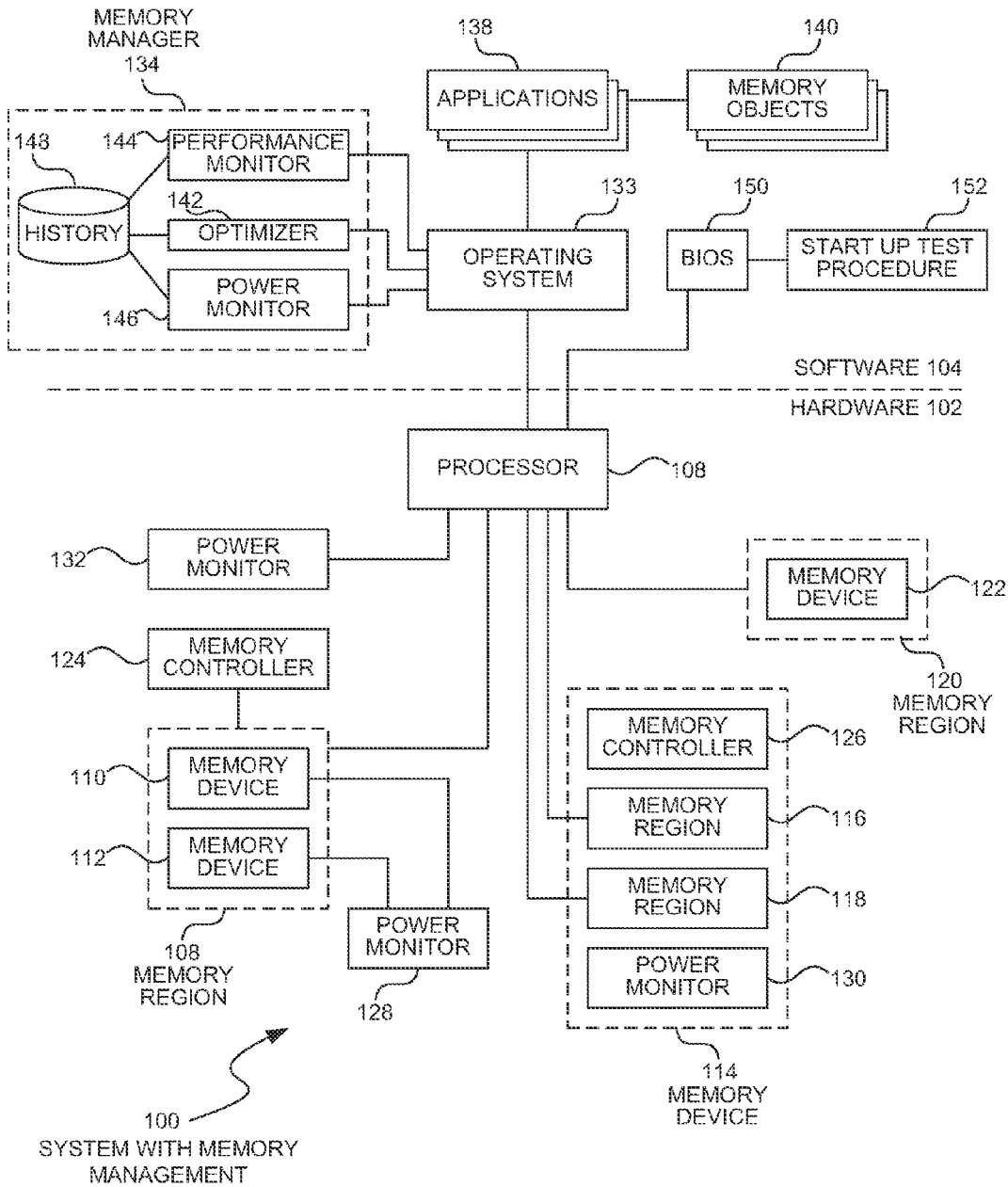
FIG. 1 is a diagram illustration of an embodiment showing a system with memory management.

A memory management system may consolidate highly used memory objects and less frequently used memory objects into separately controllable memory regions. The memory regions with less frequently used memory objects may be operated in a low power mode, while memory regions with highly used memory objects may be operated in a high power mode.

The memory management system may operate as an operating system function, and may use information about hardware topology, the usage of individual memory objects, input from applications, and other parameters to determine an optimized location for various memory objects. The optimization may be performed to maximize different parameters, such as power savings, overall performance, performance for specific applications, performance for specific virtual machine instances, or other parameters.

Many memory devices may have different operating characteristics. In a typical volatile memory device, a low power state may be used to maintain data in memory, but a high power state may be used to access the data using read or write commands. Typically, accessing such a device in a low power state may be done by raising the power state and performing the access. Such an access typically has a latency properties that affect the performance of the operation.

The memory management system may collect historical information about memory objects to determine where to place the objects. The historical information may include monitoring access frequency, the types of access, and the performance of the accesses. The historical information may be used, at least in part, to identify candidates for low power memory regions.

The memory management system may also evaluate changes made to memory objects to determine if the change improved or worsened power consumption and performance Changes that have an overall negative effect may be undone in some circumstances.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.). Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system with a memory management system. Embodiment 100 is a simplified example of a computer system that may manage power consumption by consolidating less frequently used memory objects to memory regions that may be operated in a low power state.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 illustrates a computer system that may manage memory objects to conserve power and optimize performance Embodiment 100 may represent any type of computing device that may have a processor and memory. Examples may include desktop computers, server computers, handheld computing devices, mobile telephones, personal digital assistants, or any other device that has a processor and memory.

Embodiment 100 may optimize power and performance by moving less frequently used memory objects to memory regions that may be operated in a low power state. Those memory objects that are frequently used may be also consolidated to memory regions that may be operated at high power.

A basic optimization routine may place objects in low power memory regions when those objects are accessed infrequently. More complex algorithms may use various levels of historical data, input from applications that create and use the memory objects, and monitoring of performance and power consumption to find an optimized placement.

There are many different memory technologies, and each technology may have different characteristics. In general, many types of volatile memory may consume a small amount of power to refresh the memory and may consume a higher amount of power when a read or write operation is performed. In many memory technologies, the transition from low power state to high power state may cause some delay in responding to the request. Thus, a memory device operated at a low power state may consume less power but may pay a performance price. A more detailed illustration of such an operation may be seen in embodiment 200 presented later in this specification.

In general, operating a memory device at a low power level may have an associated performance cost. In order to minimize the performance cost, those memory objects that are accessed infrequently or those that can tolerate a slower response time may be consolidated onto memory devices that may be operated at a low power level.

The memory management system may manage memory in several different ways and may use different optimization mechanisms, which may vary based on the associated applications, usage history, memory device types, or other factors.

A simple version of a memory management system may monitor blocks of memory to identify those that are frequently accessed and those that are less frequently accessed. Such a version may track a history of each unit of memory, such as a page of memory, and determine statistics that describe how frequently the memory block is being used. An optimization routine may attempt to place memory objects together based on their usage frequency to operate as many memory regions in low power mode as possible.

In versions that track a history of each unit of memory, the history may be removed or deleted when certain changes may be made to the memory device. For example, if a memory region is repurposed from a high usage to a low usage memory region, the history for that region may be deleted so that the history may not adversely affect the memory management algorithms.

The system of embodiment 100 may have a processor 106 and various memory regions, where each memory region is independently controllable to operate at different power states.

For the purposes of this specification and claims, a memory region is a portion of memory that is independently controllable to operate at different power states.

Many memory technologies are capable of operating at a low power state and a high power state, where a low power state is used to maintain or refresh the memory and a high power state is used to perform a read or write operation. In such memory technologies, the memory may exhibit higher performance at high power states and lower performance at lower power states. Other memory technologies may have additional power states that have different power consumption and different performance characteristics.

The predominant performance characteristic of a memory state may be latency or the time between receiving a read or write request and the time the completion response is transmitted. In some embodiments, other performance characteristics may be considered during optimization, including bandwidth, access time, random read or write cycle time, page-mode read or write cycle time, time required to enter or exit low-power mode, and other performance characteristics.

In some embodiments, an optimization routine may use predefined performance characteristics for memory devices with which to calculate an optimized placement. In other embodiments, a performance monitor may periodically test or monitor performance so that actual performance values may be used.

Embodiment 100 illustrates several different configurations for memory regions. In some cases, a memory region may be made up of several memory devices. In other cases, a single device may have multiple memory regions, while in still other cases, a single memory device may be treated as a single memory region.

The memory devices may be memory packages, such as DIP, SIPP, SIMM, DIMM, and other memory packages. Such packages may comprise a printed circuit board and one or more integrated circuits. In other embodiments, a memory device may be a single integrated circuit or a portion of an integrated circuit. Some memory devices may be easily removable by a user, such as a Universal Serial Bus memory device.

The memory devices may be any type of memory device, including volatile and nonvolatile memory devices. Volatile memory devices may maintain the memory contents as long as power is applied to the memory device. Nonvolatile memory may keep the memory contents even when power is removed from the device. Examples of volatile memory include Dynamic Random Access Memory (DRAM), Static Random Access Memory (SRAM), as well as other types of volatile memory. Examples of nonvolatile memory include flash memory, Electronically Erasable Programmable Read Only Memory (EEPROM), and various other types of nonvolatile memory.

The memory region 108 may comprise multiple memory devices 110 and 112. The memory devices 110 and 112 may be individual memory packages, for example. The memory device 114 may be a single device that comprises two memory regions 116 and 118. In another configuration, a memory region 120 may contain a single memory device 122.

In many computing devices, memory may be configured in a typically homogenous manner, meaning that there may be multiple memory regions that are identical or treated as identical in terms of performance. In many cases, such memory regions may be also configured to be identical in size.

In some computing devices, memory may include dissimilar memory devices or configurations. For example, a computing device may have several DRAM memory devices along with a flash memory device.

In some computing devices, two or more portions of memory may be combined in a striped or interleaved configuration. Interleaving or striping is a mechanism that may improve memory performance by using non-contiguous memory locations to store data in memory. In a typical interleaved memory application, two memory devices may be accessed by placing odd addresses on one memory device and even addresses on the second memory device. In many cases, interleaved memory may have faster response times or greater bandwidth that non-interleaved memory, especially for operations involving large amounts of data. In effect, the interleaving mechanism using two memory devices may increase throughput by increasing the bandwidth of data that may be processed by a memory system.

When two or more memory devices or memory areas are interleaved at a fine granularity such that typical memory accesses will access multiple devices or areas, the grouping of interleaved devices or areas may be treated as a single memory region for controlling high power or low power states.

In some embodiments, two or more devices may be configured for interleaved memory operations while other memory devices may be configured as non-interleaved. In a typical desktop, laptop, or server computer, the memory configurations of a computer are set prior to bootstrapping the computer. In some devices, such configurations may be set at a Basic Input/Output System (BIOS) level configuration.

Each memory region may be capable of operating at different power states. In a typical DRAM memory device, read and write operations may be performed in a high power state, and the same operations may not be able to be performed while the memory device is in a low power state. Other devices may have different performance and different capabilities in various power states. For example, some devices may permit read operations in a low power state while not permitting write operations. In another example, some memory devices may permit read and write operations at a low power level but with a slower response time or different performance characteristics than when at a high power state.

In some memory technologies, a memory device may have more than two power states, each of which may allow different operations with respective performance characteristics.

Different techniques and architectures may be used to control when a memory region enters and exits a low power state. In some embodiments, a memory region may have a controller that monitors access to the memory region and lowers the power state when no access occurs within a period of time. When a request for a read or write operation is received, the controller may raise the power level to respond to the request. After a period of time without operations on the memory device, the controller may cause the memory device to enter a low power state. In many embodiments, such a controller may be a hardware component that may operate without external input.

Examples may include a memory controller 124 that may manage the power state of the memory region 108. In another example, a memory controller 126 may be a component or built in feature of a memory device 114. Still another example may be a memory controller that may be part of the processor 106.

In some embodiments, a memory controller may receive external input. For example, a memory manager may transmit a message or signal to the memory controller to enter a low power state. Such a communication may be transmitted as part of a read or write operation, or may be a separate communication.

In some embodiments, various power monitoring mechanisms may be present in the hardware. A power monitor mechanism may be capable of measuring power consumption of a specific device or group of devices on an instantaneous, periodic, or other basis. The power monitoring mechanism may be used to determine power consumption or power savings when monitoring various operations and may be used as part of an optimization algorithm for memory object placement.

For example, a power monitor 128 may be capable of monitoring and measuring the power consumption of memory devices 110 and 112. In some cases, the power monitor 128 may be capable of measuring the power consumption of each memory device 110 and 112 individually or only as a collective group. Such a power monitoring device may be component of a power supply or power distribution system to the memory devices 110 and 112. In another example, the memory device 114 may include a power monitor 130 that may measure power consumption for the memory device 114.

In still another example, a power monitor 132 may be a system-wide power monitoring system that may be capable of measuring power consumption across the system. Depending on configuration, the power monitor 132 may be able to discriminate between and measure power consumption for individual computer components, groups of components, memory devices, groups of memory devices, or other portions of a computer system.

The processor 106 may execute various components of software 104. The software components described in embodiment 100 are example components that may be used to manage objects in memory. Other embodiments may have different software configurations or may implement some of the functionality in hardware, for example.

In a typical computing system, an operating system 136 may perform many low level functions and various applications 138 may perform higher level functions. Typically, an operating system may act as a hardware interface for applications, and applications are computer programs that perform certain functions for a user. Operating systems often provide functions, such as memory management, networking, security, file systems, and other functions that are used by applications.

Applications 138 may create many different memory objects 140 that may be stored in the various memory devices within the hardware 102. The memory objects 140 may be as small as a single bit, or large databases containing many gigabytes of data. In some cases, a read or write operation to a memory object may involve reading or writing the entire memory object. In other cases, a read or write operation may involve reading or writing only a portion of the memory object.

A memory manager 134 may operate as part of an operating system 136 to manage memory locations to optimize power consumption and performance. In other embodiments, some or all of the functions of the memory manager 134 may be an application 138, while still other embodiments may have some or all of the functions of the memory manager 134 as hardware components.

In many cases, the memory manager 134 may contain a mapping engine that assists in determining characteristics about the memory devices. For example, a mapping engine may test the latency during a read query then a memory device is in a low power state and when the memory device is in a high power state. The mapping engine may perform such tests as active test, where the mapping engine may configure a memory device in a particular state then perform a read or write operation and take measurements. In some embodiments, the mapping engine may operate passively and may monitor other applications' read and write queries to measure latency and other parameters.

The memory manager 134 may keep a mapping between virtual memory addresses and physical memory addresses. The mapping may allow applications to reference memory objects using the virtual addresses. When a memory object is moved from one memory region to another, the physical address may change in the mapping without affecting the virtual address.

The memory manager 134 may monitor memory objects stored within memory regions and may move memory objects to different memory regions to optimize power usage.

The memory manager 134 may operate in several different architectures. Two different architectures are discussed here, but other architectures may also be used. In a first architecture, the memory manager 134 may monitor all memory objects contained in memory. Such a memory manager may optimize the placement by identifying memory regions for low frequency access memory objects and other memory regions for high frequency access memory objects, then the memory manager may consolidate less frequently used memory objects together, allowing those memory regions to be operated at low power states and thus conserving power.

Such an architecture may evaluate all memory regions to select candidates for low power and high power states, then may move memory objects so that at least one memory region is operated at a low power state. Such an architecture may perform extensive optimization to tailor the memory object location for both performance and/or power savings.

In another architecture, the memory manager 134 may monitor and manage memory objects in a subset of the memory regions. Such a memory manager may monitor a memory region to identify high frequency access memory objects, then move those memory objects to other memory regions. In this architecture, the memory manager may operate to remove those memory objects that may be causing a memory region to operate at higher power states.

The second architecture may monitor a smaller set of objects any may be capable of performing some optimization with less overhead and complexity of the first architecture. In one embodiment, a memory region may be identified in BIOS or another setup mechanism as a low power memory region. This selection may be kept constant while the computer system is operational and may or may not change.

The second architecture may identify only high frequency memory objects and move those objects to other memory regions. Some embodiments may additionally identify low frequency memory objects in other memory regions to be moved to the low frequency memory region.

The memory manager 134 may have a performance monitor 144 that may monitor the access of an object, as well as the performance of various memory regions. The performance metrics may be stored in a history database 148.

The access of a memory object may be monitored and characterized to identify the memory object for placement in an appropriate memory region. In some embodiments, the performance monitor 144 may track statistics for each memory region. In such an embodiment, each page of memory or each memory object may have a set of statistics that indicate access to the memory object. In other embodiments, the performance monitor 144 may monitor read and write operations and may identify those memory objects that have high access. In such an embodiment, separate statistics may or may not be kept for each memory object or memory page within memory.

When an embodiment identifies those objects with high access frequency, the remaining objects may be assumed to be low frequency access objects. Such an embodiment may keep fewer statistics and information about objects in memory.

The performance monitor 144 may also measure the latency, response time, throughput, or other performance parameters of a memory region. In such embodiments, the performance monitor 144 may store the actual performance characteristics of a memory region for use in optimization. Some such embodiments may measure performance characteristics of a system before and after implementing an optimized location of various memory objects. Such measurements may be used to verify that an optimized location is performing as expected and, in the case that the new location does not perform as well as the previous setting, may be used to revert to the previous location.

The memory manager 134 may have an optimizer 142 that may identify and optimize placement for memory objects and cause those memory objects to be moved according to an optimized placement. The optimizer 142 may use different input information to perform an optimization. In some embodiments, the history database 148 may be consulted to identify high frequency or low frequency access memory objects.

Some embodiments may include indicators from various applications 138 that may identify specific memory objects that will have higher or lower access. For example, an application may be changing operational states from an active mode to a sleep or dormant mode. When such a change occurs, the application 138 may communicate directly or indirectly with the memory manager 134 and the optimizer 142 to move memory objects associated with the application to an appropriate memory region.

Some memory managers 134 may have a power monitor 146. The power monitor 146 may be used to gather actual power consumption data while a memory region is in a high power state or a low power state. The power monitor 146 may interface with and communicate with various hardware power monitors 128, 130, and 132.

In some embodiments, the memory manager 134 may use the power monitor 146 to calculate a power savings. In one such embodiment, the memory manager 134 may measure power consumption of a memory device while in a low power state and again when the memory device is in a high power state. The difference between the power consumption multiplied by the length of time the device is in the low power state may be calculated to be the approximate power savings.

Some embodiments may verify performance and power savings after implementing a change. Such embodiments may measure performance and power savings both before and after moving memory objects to different memory regions, and if adequate performance or power savings are not achieved, may revert to the previous configuration.

In some embodiments, a BIOS may be used to configure the hardware 102 prior to bootstrapping an operating system 132. The BIOS may be used to configure the various memory regions. In some embodiments, a BIOS setting may be used to identify some memory regions as interleaved as well as to identify specific memory regions as candidates for low power state operation.

The BIOS 150 may also include a startup test procedure 152. The startup test procedure 152 may perform performance measurements of various memory regions. The startup test procedure 152 may cycle through each memory region and perform a read and write operation while the memory region is in a high power state and again while the memory region is in a low power state. Each memory region may be tested in this manner and the performance of the memory regions may be stored for use by an optimizing algorithm or routine.

Figure 2:
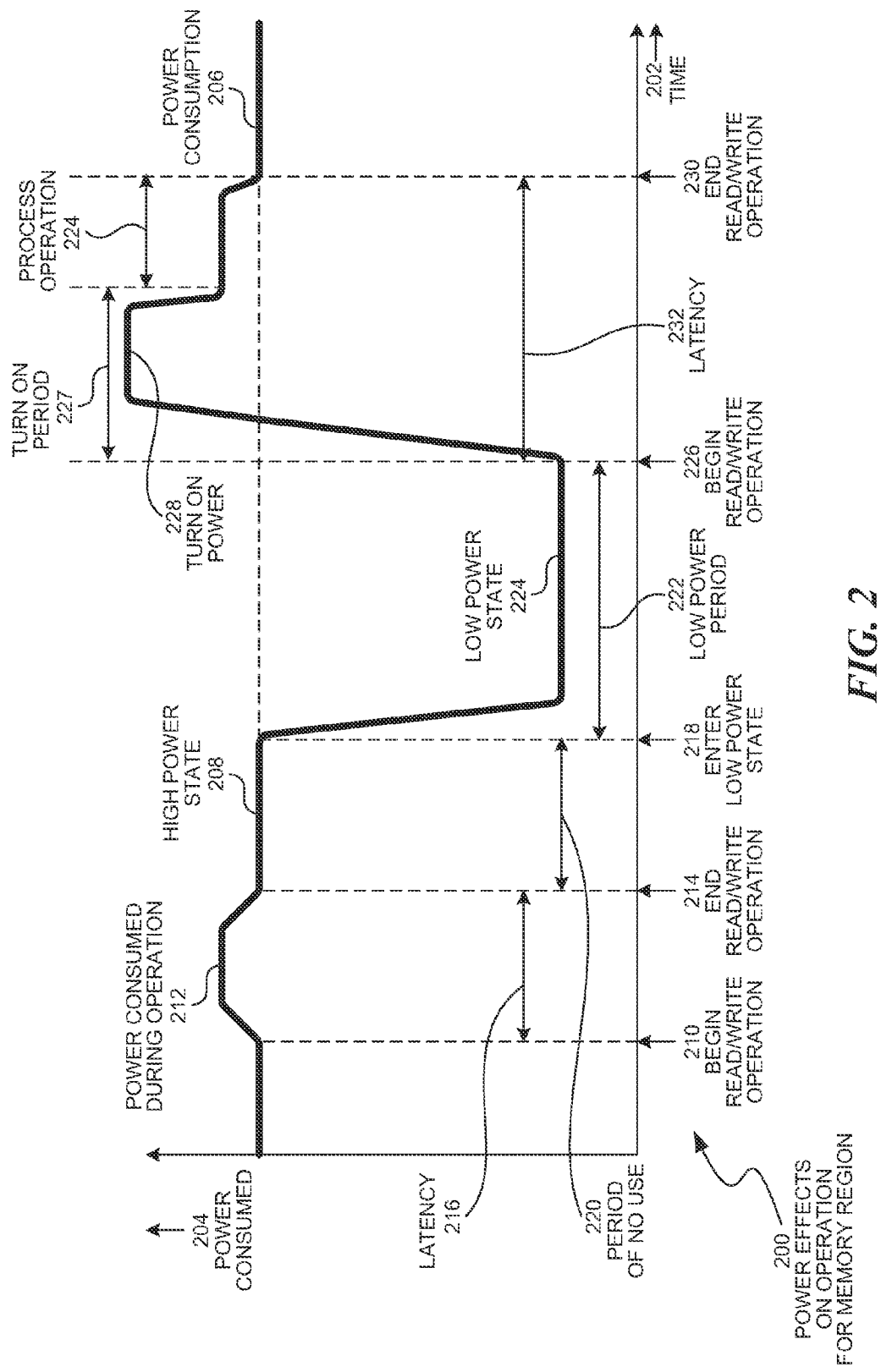
FIG. 2 is a diagram illustration of an embodiment showing a power curve over time for a memory device.

FIG. 2 is a diagram illustration of an embodiment 200 showing a power verses time chart for a memory device or memory region. Embodiment 200 is not to scale, but is used to illustrate general power consumption and performance concepts that may reflect the actual operation of many different memory technologies.

The illustration of embodiment 200 is an example of a typical DRAM memory device. Other devices may have different power consumption characteristics.

Embodiment 200 illustrates power consumed 204 with respect to time 202. A curve representing power consumption 206 is shown.

At the beginning of the curve, a high power state 208 is shown. At time period 210, a read or write operation may be started, and the operation may end at time period 214. During the operation the memory device may consume a higher level of power indicated by area 212. After the operation, the device may remain at the high power state 208.

The operations until time period 214 illustrate a typical read or write operation while a memory device is in a high power state 208. During such an operation, a latency 216 may reflect the time between receiving a command and responding to it, as illustrated by time periods 210 and 214.

In many embodiments, a memory controller may monitor a memory device that is at a high power state 208 and may cause the device to enter a low power state 224 at period 218. Many such embodiments may wait for a predetermined amount of time of no activity, illustrated as time period 220, before entering a low power state 224.

When a typical memory device is in a low power state 224, the device may not be able to respond to read or write requests. Some memory devices may be able to perform some operations at a low power state 224 while other operations may be only performed at a high power state 208.

At time period 226, a read or write operation may be received. Because the device is in a low power state 224, the device may consume a higher power level 228 during a turn on period 227. After the turn on period 227, the device may process the operation during time period 229 and return to a high power state 208 at time period 230.

Because the device was at a low power state 224 when a read or write operation was received at time period 226, the latency 232 for responding to the request may be considerably longer than the latency 216 when the device was at a high power state 208. The increased latency 232 may be a performance factor that is encountered when a device is operated in a low power state.

Figure 3:
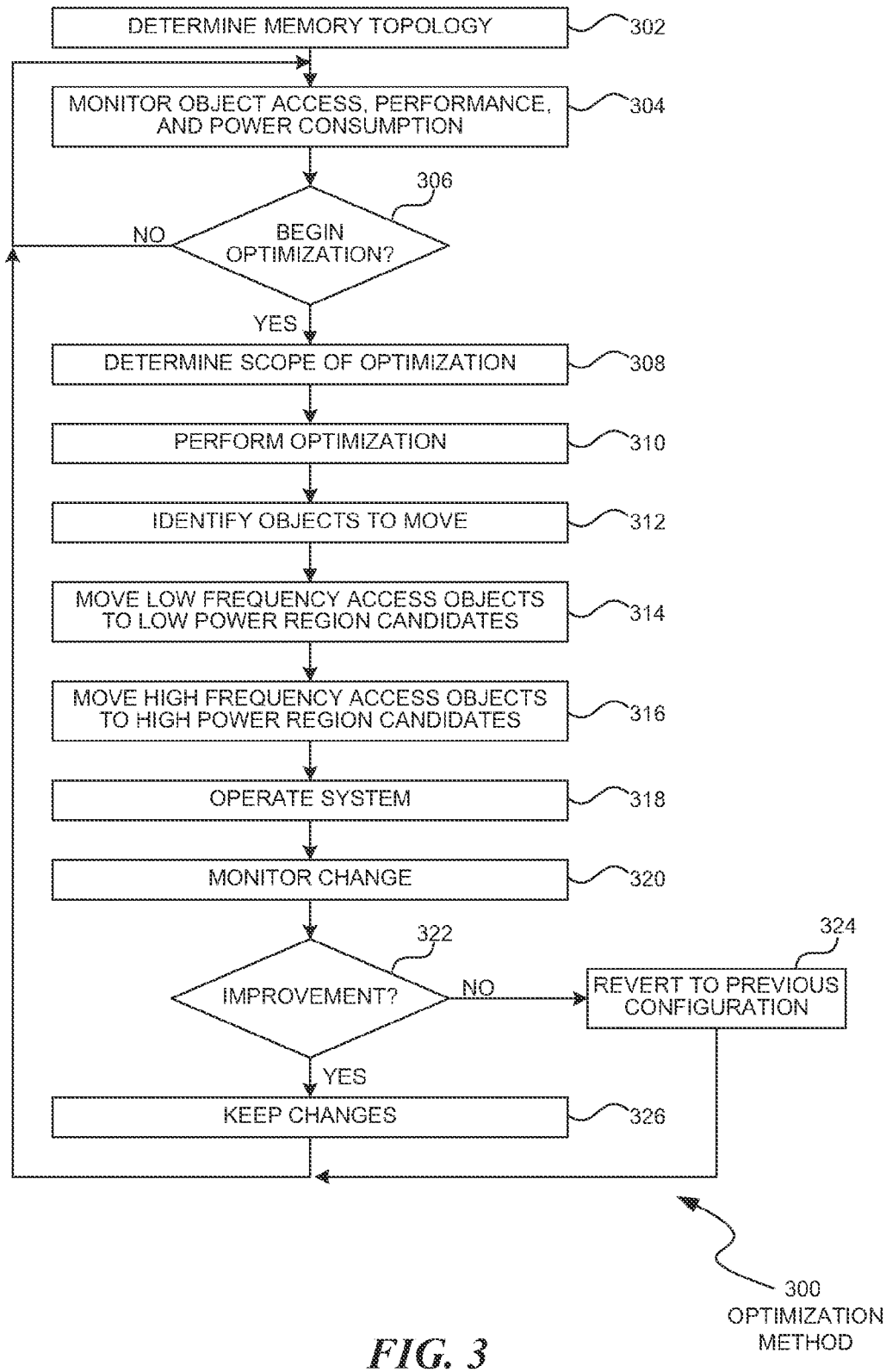
FIG. 3 is a flowchart illustration of an embodiment showing a method for optimizing memory objects within memory regions.

FIG. 3 is a flowchart illustration of an embodiment 300 showing a method for managing memory objects. Embodiment 300 is a simplified example of a method that may be performed by a memory manager, such as the memory manager 134 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates an optimization method that may be performed by a memory manager. The method of embodiment 300 is merely one example of a method that may be used to operate some memory regions in a low power mode with a minimum of performance degradation.

The optimization of embodiment 300 may relocate various memory objects so that power savings and performance may be optimized. By locating infrequently used memory objects together in a common memory region, the memory region may be operated in a low power state. In some embodiments, an optimization algorithm may perform a tradeoff between power savings and performance characteristics, and the optimization algorithm may be variable such that a user may be able to select weighting factors for power savings or performance.

An optimization algorithm may be any type of heuristic, process, or mechanism used to determine memory object placement. In some embodiments, a simple heuristic may be used, while other embodiments may perform a complex optimization by evaluating many different placement scenarios and selecting one of the scenarios. In many such optimizations, a performance cost and/or power cost may be calculated for each scenario, along with a projected benefit in terms of power savings or performance benefit, if any. Still other embodiments may use other optimization mechanisms.

In block 302, the memory topology may be determined. The memory topology may include identifying each memory region and various characteristics of the memory region. The characteristics may vary between different embodiments, and may include the size and performance characteristics of the memory region, the address space occupied by each memory region, mechanisms used to control the memory region, and other factors.

The memory topology may include a definition and configuration of memory banks, memory ranks, specific DIMMs, memory channels, memory circuits, integrated circuit devices, power rails or controls for memory regions, and other elements that define memory configuration. The definition of a memory topology may be different for various embodiments, and may be tailored to the type of optimization and level of control that a memory manager may have within a device. In some cases, a memory manager may be capable of managing memory objects at a precise level of control, such as being capable of identifying specific memory circuits in which a memory object may be stored. In other cases, a memory manager may have a more coarse level of control.

In some embodiments, different memory regions may have different performance characteristics, and those performance characteristics may be used to optimize memory object placement. For example, if a memory region consists of two interlaced DIMM memory devices, that memory region may have a higher response time and better throughput than other memory regions that have non-interlaced DIMM memory. Consequently, the memory region containing the interlaced DIMM memory devices may be considered as a candidate for highly accessed memory objects while the other memory regions may be candidates for low power state operation and infrequently accessed memory objects.

The memory topology may include mechanisms for a memory manager to control the memory region. Such mechanisms may include a messaging or communication mechanism by which a memory manager may request a memory region to operate in a high power or low power state.

In some embodiments, the topology determined in block 302 may be determined during a BIOS or bootstrap operation that may occur before or at the beginning of loading and executing an operating system. The topology may be determined by a BIOS level or operating system level routine that may detect each memory region, perform a query, and gather topology information.

In some such embodiments, a performance test may be made on each of the memory regions to determine performance metrics for the memory regions. Such a test may involve setting the memory region to a low power state and measuring the latency of a read or write request to the memory region, and also performing a similar test when the memory region is set to a high power state.

In block 304, memory objects may be monitored for access frequency, performance, and power consumption. Block 304 may include many different monitored factors that may be used by an optimization routine.

If an optimization is not performed in block 306, the process may return to block 304 to generate a history of access frequency and other factors. In some embodiments, the performance and power consumption may change with the workload of the device and the data stored in memory. In such embodiments, performance and power consumption data may be collected and stored for individual memory objects or groups of memory objects.

The optimization in block 306 may be triggered by different mechanisms in different embodiments.

In some embodiments, an optimization may be performed on a periodic basis, such as every few minutes, every hour, every day, or some other predetermined basis. In such embodiments, a timer or other mechanism may launch an optimization in block 306.

In some embodiments, a device operates for long periods of time, such as servers or other computers that may operate continually for many days, weeks, or months. Such devices often have regular periods where the load on the device fluctuates. Often, these periods are predictable. For example, a server used by a business may be busy during normal business hours, but may be used lightly at night and during non-business hours. Such a server may perform some operations at night, such as backup operations for example. Such a server may have predictable times when the usage of the device may change, and an optimization may be performed prior to or just after the usage may change.

In such embodiments, a performance monitor may monitor the periodic usage of the device and may predict when an optimization may be performed based on the past history of the device.

In some embodiments, a change in an application may indicate that an optimization may be performed. A performance monitor may monitor specific applications or general computational activity on a device and may determine that one or more applications have increased or decreased activity. Based on the change in activity, an optimization may be performed.

Some embodiments may trigger an optimization based on direct notification from an application. For example, an application that has been triggered to come out of a sleep mode and perform extensive calculations may send an alert, trigger, or other indicator to a memory manager to optimize the memory locations based on the application's change of status.

In block 308, the scope of the optimization may be determined. In some embodiments, an optimization may be performed for a specific memory region, memory objects having specific characteristics, or other scopes.

In some cases, an optimization may be performed on all memory regions and may consider all memory objects. In such embodiments, an optimization in block 310 may analyze usage history for all memory objects, identify high and low frequency usage memory objects, identify memory regions for those memory objects, and move the memory objects to the respective memory regions. In many cases, such an optimization may evaluate many different placement scenarios and may select an optimized placement scenario based on performance and power factors.

In some such embodiments, several groups of memory regions may be identified for memory objects with similar usage frequency. In some cases, memory objects may be consolidated in memory regions bases on usage frequency metrics that are independent of other memory objects. In some cases, memory objects may be consolidated into memory regions where the usage frequency correlates with other memory objects. For example, several memory objects may have similar usage patterns where the objects are frequently used at the same time but may be dormant at the same time. Such objects may be consolidated into the same memory region to maximize power savings. In some embodiments, such memory objects may be related to a single application and may be identified by their relationship to the application. In other embodiments, the usage history of the memory objects may be compared to group memory objects that are highly and lightly used at the same time.

In some embodiments, an optimization may be performed for a specific type of data, or for data associated with a specific application. In such cases, the optimization of block 310 may consider only moving those memory objects having the designated type of data or that are associated with the designated application. Such optimization routines may identify memory regions for high and low power states and move memory objects accordingly.

In some embodiments, an optimization routine may operate by identifying highly accessed memory objects and grouping those memory objects in a designated memory region. Conversely, some embodiments may operate by identifying infrequently accessed memory objects and moving those objects to a memory region that may be often at a low power state. Such embodiments may identify memory objects from other memory regions to populate identified memory regions.

Other embodiments may use an optimization routine that examines a memory region to identify memory objects to move out of the memory region. For example, a designated highly accessed memory region may be analyzed to identify memory objects that are not highly accessed and may attempt to move those memory objects to other memory regions. In another example, a memory region designated as a low power state memory region may be analyzed to identify highly accessed memory objects in the memory region and the optimization routine may attempt to move those memory objects to other memory regions.

In embodiments where optimization is performed for a specific application or specific type of data, those memory objects may be analyzed to determine if the memory regions in which the memory objects are stored are appropriate for those objects. For example, such an optimization may identify various memory regions as highly accessed or lightly accessed, then compare the identified memory objects to determine if the usage history of the memory objects are compatible with the memory regions. Any incompatibility may be rectified by moving the incompatible memory objects to different memory regions.

Throughout this specification, optimization routines have been exemplified by designating memory regions or memory objects as being two classes: frequently accessed and infrequently accessed. Such a designation is used as a simplified way to describe the optimization, but is not intended to be limiting. In some embodiments, the access frequency of memory objects and memory regions may be grouped in two, three, four, or more levels or categories. For example, memory objects and memory regions may be grouped as high, medium, and low frequency categories.

In some embodiments, the type of access to a memory object may have an effect on performance and power savings. In such embodiments, those memory objects having similar types of access may be grouped together in memory regions. For example, some embodiments may group memory objects together that are frequently accessed using read commands separately from memory objects that are frequently accessed using write commands. Some embodiments may group read-only data separately, in another example. Some embodiments may group memory objects by data type, such as Boolean data, string data, numerical data, or other complex data types, when such data types may be exposed to a memory manager. In another example, memory objects created by a certain application may be grouped together.

The optimization in block 310 may result in identification of objects to move in block 312, as well as identifying candidate memory regions for high frequency access and low frequency access. The low frequency access memory regions may be those that may be operated in a low power mode as often as possible. After identifying the memory objects to move, the low frequency access objects may be moved to low power regions in block 314 and high frequency access objects may be moved to high frequency access memory regions in block 316.

After the changes are implemented in blocks 314 and 316, the system may be operated in block 318. During the operation of block 318, those memory regions that have infrequently accessed memory objects may be operated in a low power state more often than before the changes of blocks 314 and 316. If such an improvement is found in block 322, the changes may be kept in block 326 and the process may return to block 304. If such an improvement is not detected in block 322, the changes may be reverted to a previous configuration in block 324 and the process may return to block 304.

Block 322 may examine the performance and power savings of the optimization of block 310 and may determine if the optimization goals have been met. In some embodiments, the optimization goals may be purely power savings, or may be a combination of power savings and performance. If those goals are not met, the system may undo the changes in block 324.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
  a plurality of memory regions, each of said memory regions having at least a low power state and a high power state;
  a controller to manage the power states of said memory regions separately and independently;
  a performance monitor to measure a performance characteristic of memory objects in each of said memory regions;
  a processor to manage memory contents by a method comprising:
    monitoring each of a plurality of memory objects to determine an access frequency for each of said memory objects;
    monitoring each of said plurality of memory objects to determine said performance characteristic for each of said memory objects;
    identifying a first memory region as a candidate for low power operation;
    determining an optimized location for at least a subset of said plurality of memory objects, said optimized location being determined based on said performance characteristic;
    from said optimized location, identifying a first memory object as a low frequency access object;
    moving said first memory object to said first memory region; and
    operating said first memory region in said low power state.

2. The system of claim 1, said method further comprising:
  identifying a second memory region as a candidate for high power operation;
  identifying a second memory object in said first memory region as a high frequency access object;
  moving said second memory object from said first memory region to said second memory region; and
  operating said second memory region in said high power state.

3. The system of claim 2, said system further comprising:
  calculating a power savings by monitoring said first memory region to determine a length of time said first memory region is operated in said low power state and determining said power savings as a function of said length of time.

4. The system of claim 2, said plurality of memory regions being identical memory regions.

5. The system of claim 2, at least two of said plurality of memory regions being dissimilar.

6. The system of claim 5, one of said memory regions being a removable memory region.

7. The system of claim 2, said second memory region being an interleaved memory region comprising at least two memory devices with interleaved addressing.

8. The system of claim 1 further comprising:
a mapping engine to test at least one of said memory regions to determine a latency for a read query when said memory region is in said low power state.

9. The system of claim 8, said mapping engine further to operate as part of a startup operation.

10. The system of claim 8, said mapping engine further to determine a first power consumption for said memory region in said low power state and a second power consumption for said memory region in said high power state.

11. The system of claim 1 further comprising:
a power monitoring system configured to measure power consumption for each of said memory regions.

12. A method being performed on a computer processor, said method comprising:
receiving a memory topology comprising a memory address range for each of a plurality of memory regions, each of said plurality of memory regions being separately controllable to a high power state and a low power state;
monitoring a plurality of memory objects within said memory regions to determine an access frequency measurement for each of said plurality of memory objects;
monitoring each of said plurality of memory objects to determine said performance characteristic for each of said memory objects;
determining an optimized location for at least a subset of said plurality of memory objects, said optimized location being determined based on power consumption determined by said performance characteristic;
from said optimized location, identifying a first memory region as a candidate for low power operation;
identifying a first memory object as a high frequency access object and being located within said first memory region;
moving said first memory object to a second memory region; and
operating said first memory region in said low power state.

13. The method of claim 12, further comprising:
identifying a second memory region as a candidate for high power operation;
identifying a second memory object in said second memory region as a low frequency access object;
moving said second memory object from said second memory region to said first memory region; and
operating said second memory region in said high power state.

14. The method of claim 13, further comprising:
detecting a first interaction with said second memory object when said first memory region is in said low power state;
measuring a first latency for said first interaction; and
storing said first latency.

15. The method of claim 14 further comprising:
detecting a second interaction with said second memory object when said first memory region is in said high power state;
measuring a second latency for said second interaction; and
storing said second latency.

16. The method of claim 15 further comprising:
determining a performance penalty based on a difference between said first latency and said second latency.

17. The method of claim 15 further comprising:
determining a first power consumption during said first interaction;
determining a second power consumption during said second interaction;
determining a time period said first memory region is in said first power state; and
determining a power savings based on a difference between said second power consumption and said first power consumption multiplied by said time period.

18. A system comprising:
a plurality of memory regions, each of said memory regions having at least a low power state and a high power state;
a controller to manage the power states of said memory regions separately and independently;
a power monitor to measure power consumption for each of said memory regions;
a performance monitor to measure latency for interactions with memory objects in each of said memory regions;
a processor configured to manage memory contents by a method comprising:
monitoring each of a plurality of memory objects to determine an access frequency for each of said memory objects;
determining an optimized location for at least a subset of said plurality of memory objects, said optimized location being determined based on power consumption determined by said power monitor and latency determined by said performance monitor;
from said optimized location, identifying a first memory region as a candidate for low power operation;
identifying a first memory object as a low frequency access object;
moving said first memory object to said first memory region; and
operating said first memory region in said low power state.

19. The system of claim 18, at least two of said plurality of memory regions being dissimilar.

20. The system of claim 18, said method being performed as part of an operating system level function.

* * * * *